Sept. 20, 1960   J. KOWALSKY ET AL   2,953,784
OVERWATER ANTENNA

Filed March 17, 1959   3 Sheets-Sheet 2

INVENTOR.
JOHN KOWALSKY
HENRY SALTZMAN
BY PETER R. CLOUD

ATTORNEY

United States Patent Office 2,953,784
Patented Sept. 20, 1960

2,953,784
OVERWATER ANTENNA

John Kowalsky, Brewster, Henry Saltzman, White Plains, and Peter R. Cloud, Hartsdale, N.Y., assignors to General Precision, Inc., a corporation of Delaware Filed Mar. 17, 1959, Ser. No. 800,046

6 Claims. (Cl. 343—770)

This invention relates to Doppler microwave antennas for use in aircraft navigation. More particularly the instant invention relates to a planar array utilized to receive Doppler shifted echo signals containing ground speed and drift information, the array being so designed that echo signals of increased strength are received from overwater areas.

The overwater antenna consists of a plurality of linear arrays arranged in pairs in a plane, so that the spacing between successive linear arrays are alternately large and small. By judicious selection of these spacings, and by other means, an improvement in overwater echo signal return amplitude is secured without impairing the overland return and without foregoing any of the advantages of prior antennas.

When a beam of microwave radiation is directed from an aircraft toward the earth, the strength of the echo signal received at the aircraft depends, among other things, on whether the reflecting surface is land or water, and, if the latter, on the angle of incidence and the sea state, or roughness of the water surface. For example, at an angle of incidence of 33° a water surface on the GPL Water Surface Condition Scale of 3, corresponding to 1 or 2 on the Beaufort wind scale, has scatter properties reflecting 13 db less microwave signal than a land surface would. At 21° incidence the water and land signals are equal. Smooth water scatters or reflects less energy to the receiver and rougher water more.

The present antenna employs an angle of incidence of 25°, thereby reducing the signal loss to 5.5 db from the 13 db suffered at 33°.

The angle of radiation from a linear array or from a planar array in a selected plane depends on the spacing of the radiating elements. In this case the angle of incidence of the microwave beam at the earth's surface is reduced by increasing the element spacing. However, when this conventional approach is applied, it is found that unwanted primary lobes of radiation are produced in the beta angle direction, which is the angle to the planar array normal direction in the plane perpendicular to the linear arrays. Specifically, as the element transverse spacing is increased, reducing the beta angle from 25° to 13°, radiation in the lateral plane exhibits two new primary lobes as strong as the desired +13° primary lobe, one at an angle of about −42° and one at an angle greater than +90°.

In order to reduce the strength of the unwanted beta angle lobe at −42° to a permissible amount, the method of pattern multiplication is employed. This method depends on the fact that the field pattern of an array of non-isotropic but similar point sources is the product of the pattern of the individual source and the pattern of an array of isotropic point sources, having the same locations, relative amplitude and phases as the non-isotropic point sources.

In fact in the present invention this principle is applied twice: two remedies, each superimposing new directivity, are employed. For the first remedy, the uniform spacing of the elements is changed to non-uniform spacing consisting of a wide spacing alternating with a narrow spacing. This has the effect of providing a gross design of gross elements providing the gross radiation pattern computed as generated by isotropic elements and of providing a fine design because each gross element consists of a pair of elemental radiators. The gross radiation pattern depends on the gross spacing $d$, while the fine radiation pattern depends on the fine spacing $d'$ between the two elemental radiators composing each gross element. The net radiation pattern is the product of the gross and fine patterns. The fine pattern is so designed that one of its nulls falls at the lateral −42° angle of the unwanted primary lobe and, the magnitude of this lobe thereby being multiplied by the zero magnitude of the fine pattern null, this lobe is therefore completely eliminated at that point.

The second remedy consists of selecting as the elemental radiator an oblique slot in the narrow side of a rectangular waveguide. The oblique slot is partly wrapped around the waveguide onto its two broad faces. This multiplies the above-discussed net radiation pattern by the non-isotropic slot radiating pattern, further reducing unwanted lateral radiation in the vicinity of −42° and at +90°.

Additional control of the pattern is effected by the addition of reflecting surfaces.

One purpose of this invention is to provide a Doppler microwave antenna giving an overwater signal of improved intensity.

Another purpose of this invention is to provide a Doppler microwave antenna for use on an aircraft over water in providing signals representing aircraft ground speed and drift angle, the Doppler echo signals having an improved intensity without having extraneous lobes of radiation and without the sacrifice of other advantages necessary or desirable in such use.

A further understanding of this invention can be secured from the detailed description and associated drawings, in which.

Figure 1:
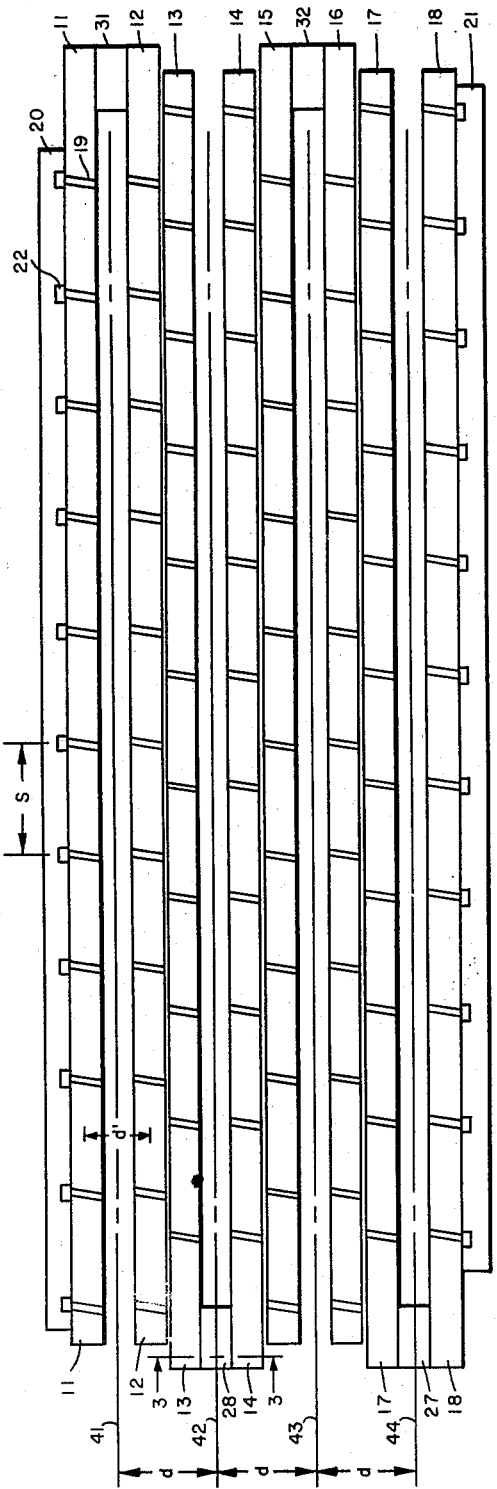
Figure 1 is a plan view of the radiating face of an embodiment of the overwater antenna.

Referring now to Fig. 1, eight rectangular waveguides 11, 12, 13, 14, 15, 16, 17 and 18 are positioned parallel to each other in a plane. Each waveguide carries 11 microwave radiators, such as radiator 19, equally spaced at the distance $s$ equal to one-half wavelength in guide. Each waveguide is fed at one end and short circuited at the other so that its radiators form a resonant linear array.

The radiators are resonant half-wavelength shunt slots cut into the narrow waveguide face. Since the narrow waveguide dimension is slightly less than one-half wavelength, each slot is extended at each end into a broad waveguide face. All waveguides are separated at least slightly, so as not to short-circuit or unduly shield the overlapping ends of the radiating slots. Each slot is positioned at a small angle to the wave guide transverse direction to provide shunt coupling to the interior microwave field.

Two narrow metal reflectors, 20 and 21, are positioned adjacent to the outer linear arrays in the radiating plane. In order not to short-circuit the overlapping ends of the slot radiators of these arrays, each of these reflectors is cut out adjacent to each slot as, for example, in the area 22.

Figure 2:
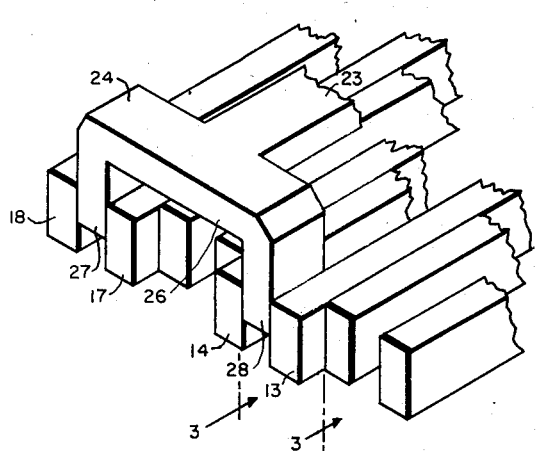
Figure 2 is a detail view illustrating the microwave feed connections utilized.
Figure 3:
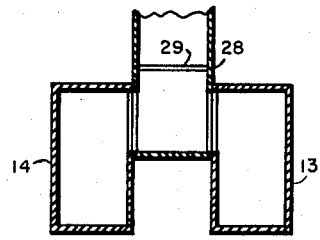
Figure 3 is a cross section of a feed waveguide transition taken on the line 3—3 of Fig. 1.

In the transverse direction in the radiating plane, perpendicular to the waveguide axial direction, the radiating slots may be considered to constitute transverse linear arrays. All slots of waveguides 11, 12, 15 and 16 are aligned transversely, and all slots of the other four waveguides 13, 14, 17 and 18 are aligned transversely as a separate group. The slots of waveguides 11, 12, 15 and 16 are offset as respects the slots of waveguides 13, 14, 17 and 18 by the distance $s/2$. The waveguides are fed in pairs, one pair being composed of waveguides 11 and 12, and the other pairs being waveguides 13, 14; 15, 16; and 17, 18. The waveguides of a pair are fed in parallel at adjacent ends by microwave energy of the same phase. Further, the two pairs containing waveguides 13, 14, 17 and 18 are fed from adjacent ends by microwave energy in phase. This feed arrangement is illustrated in Figs. 1 and 2 showing microwave energy applied from a feed waveguide 23 through a shunt T having collinear arms 24 and 26 connected to apertured arms 27 and 28. Each of arms 27 and 28 feeds a pair of waveguides, apertured arm 27 feeding waveguides 17 and 18 and apertured arm 28 feeding waveguides 13 and 14. The detail of an apertured arm and its fed waveguides is shown in Fig. 3. Matching is effected by the iris 29.

The other waveguides 11, 12, 15 and 16 are similarly fed through apertured arms 31 and 32.

In the operation of the antenna of the invention, in one method of use the antenna is stabilized in an aircraft with its radiating face in a horizontal plane, facing downward toward the earth. The antenna's longitudinal axis is held in the direction of the horizontal component of the aircraft velocity.

When the energy phase in the microwave feed waveguides is such that the energy entering all eight linear array waveguides has the same phase, two diametrically opposite narrow beams of microwave radiation are simultaneously emitted. For example, one beam is downward, forward and to the right and the other is symmetrically downward, to the rear and left. When energy in one feed such as in feed waveguide 23 is reversed in phase, the beam directions are changed to symmetrical beams in the other two quadrants.

Figure 4:
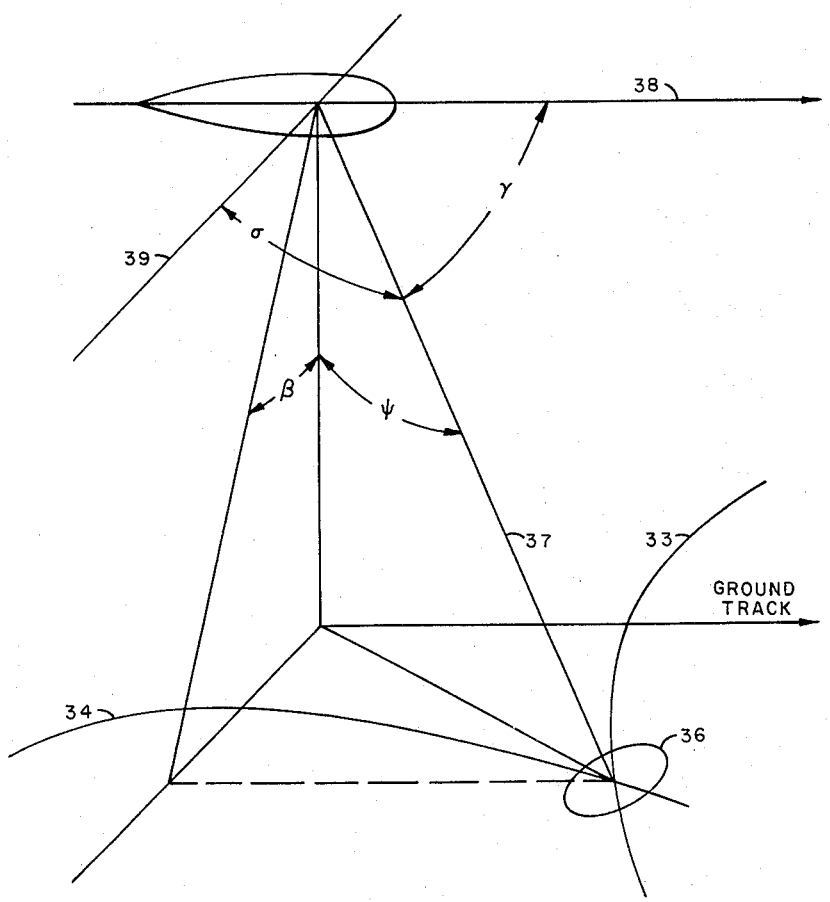
Figure 4 depicts the geometry of a beam radiated by the antenna of the invention.

One way of regarding beam formation is to consider the longitudinal radiation by itself, as from a single linear array, forming two cones of radiation coaxial with the longitudinal axis forward and backward, except for the parts shielded by the waveguides, with half-cone angle $\gamma$. The intersection of one of these cones with the earth is shown in Fig. 4 by the hyperbola 33. The lateral radiation from any transverse line of radiators forms two partial cones on the transverse axis each with the cone half-angle $\sigma$. The intersection of one such cone with the earth is indicated by the hyperbola 34. Phase coincidence of these cones occur at two lines illuminating two areas of the earth, one of which is indicated by the area 36. Fig. 4 shows the angle $\gamma$ between the beam 37 and the horizontal velocity axis 38 coinciding with the array longitudinal axis. This angle is 68° in the present example. Fig. 4 also shows the angle $\sigma$ between beam 37 and the transverse horizontal axis 39. The angle $\beta$ is defined as the angle from the vertical direction to the transverse projection of the beam, and is useful in design. The angle between the beam and the vertical direction is the angle of incidence and is designated $\psi$.

Since the linear arrays 11 and 12, Fig. 1, are fed in phase, and the arrays 13 and 14 are fed in phase, each pair emits radiation which at a distance behaves in some respects as if it came from a single hypothetical linear array, one of the hypothetical arrays being positioned at the line 41 half-way between the arrays 11 and 12 and the other being positioned at the line 42 half-way between the arrays 13 and 14. Similarly, radiation from the pair of arrays 15 and 16 behaves as if it came from a hypothetical array with center line 43, and radiation from the pair of arrays 17 and 18 behaves as if it came from a hypothetical array with center line 44.

Figure 5:
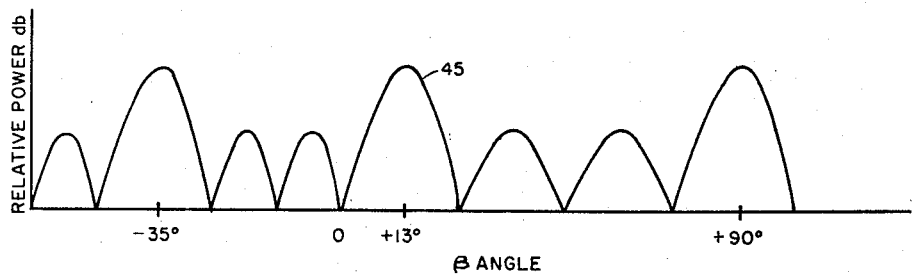
Figure 5 is a graph depicting the variation with $\beta$ angle of the intensity of antenna radiation due to gross transverse radiator spacing.

What may be termed the gross side radiation is that which would be emitted by a plurality of transverse linear arrays, side by side, each of four elements, each element being on one of the center lines 41, 42, 43 and 44 and each element being an isotropic radiator. This gross radiator has equal spacings $d$ large enough to secure the desired reduced angle of incidence. The side cone gross radiation pattern of Fig. 5 is emitted having a desired principal lobe 45, showing that the $\beta$ angle has been reduced from 25° to 13°, corresponding to a reduction of $\psi$ from 33° to 25°, the angle of $\gamma$ being 68°. The unwanted radiation in the $+\beta$ direction is just beyond 90°, where it becomes imaginary. An unwanted lobe at $-42°$ has nearly the same amplitude as that of the desired $+13°$ lobe.

The expression for the gross side radiation magnitude $E_1$ at various $\beta$ angles in terms of the distance $d$ between the gross radiators is $$E_1 = \cos\left(\frac{\pi}{2} - \frac{2\pi d}{\lambda} \sin \gamma \sin \beta\right) \cos\left(\frac{\pi d}{\lambda} \sin \gamma \sin \beta - \frac{\pi}{4}\right) \quad (1)$$

Figure 6:
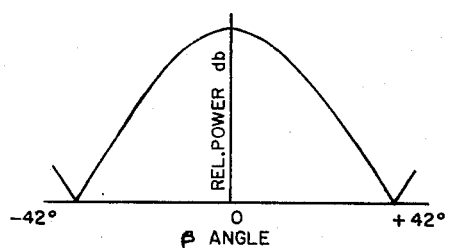
Figure 6 is a graph depicting variation with $\beta$ angle of radiation due to fine transverse radiator spacing.

The graph of Fig. 5 is plotted from this equation. Each of the pairs of linear arrays, in radiating as if it were a single array, is not actually isotropic in the lateral plane but has the directivity shown by Fig. 6 and expressed by $$E_2 = \cos \frac{k}{2}\left(\frac{2\pi d}{\lambda} \sin \gamma \sin \beta\right) \quad (2)$$

in which $$k = \frac{d'}{d} \quad (3)$$

and $d'=$ distance between the two linear arrays of a pair. The distance $d'$ is shown in Fig. 1 and is the same for all of the pairs of linear arrays.

The narrow-side, wrapped-around slot used as the individual radiator of the instant planar array does not radiate isotropically. In the plane perpendicular to the linear array through a slot the slot radiation is strongest perpendicular to the slot, at $\beta=0$, and is approximately zero at 90°. The radiation variation is approximately proportional to the cosine of $\beta$. Therefore this element pattern, superimposed on the gross and fine patterns, augments the directivity in the $\beta=+13°$ direction relative to the $\beta=-42°$ direction. As a rough approximation this element directivity can be expressed as $$E_3 = \cos \beta \quad (4)$$

The total directivity, $E_T$, is the product of the gross, fine and element directivities, so that $E_T$ is proportional to the product of (1), (2) and (4), or $$E_T \alpha E_1 E_2 E_3 \quad (5)$$

It has been found in practice that the baffle plates 20 and 21 reduce the magnitude of the undesired $-35°$ lobe of radiation by reducing the edge effects without appreciably increasing the amount of microwave power reflected back to the microwave generator.

Although for the purpose of illustration the planar array herein described is composed of eight linear arrays and each linear array is composed of eleven radiators, these quantities may be increased or decreased with corresponding changes in the cross sections of the radiated beams. The antenna has been described as horizontally stabilized, but the invention is applicable to antennas stabilized in any other manner and to unstabilized antennas fixed in the aircraft.

What is claimed is:

1. A microwave antenna comprising, at least four linear arrays arranged in pairs and in parallel side by side relation, the individual linear arrays forming each pair of arrays being transversely spaced with respect to each other by a first selected distance and adjacent pairs of arrays being transversely spaced by a second selected distance greater than said first distance, means for applying microwave energy to one end of each of the linear arrays forming a pair of arrays and means for applying microwave energy to the other ends of each of the linear arrays forming an adjacent pair of arrays.

2. A microwave antenna comprising, at least four rectangular waveguide sections arranged in pairs and in parallel side by side relation, one face of each of said waveguide sections being provided with equally spaced inclined slots whereby each waveguide section constitutes a linear array, the waveguide sections of each pair being transversely spaced from each other by a first selected distance with adjacent pairs of waveguide sections transversely spaced by a selected distance greater than said first distance, means for applying microwave energy to one end of alternate pairs of waveguide sections and means for applying microwave energy to the other ends of the remaining waveguide sections.

3. A microwave antenna comprising, at least four rectangular waveguide sections arranged in pairs and in parallel side by side relation with their narrow faces lying in the same plane, said narrow faces being provided with inclined half-wavelength slots longitudinally spaced by equal half-wavelength distances along said waveguide sections, the waveguide sections of each pair being transversely spaced from each other by a first selected distance with adjacent pairs of waveguide sections transversely spaced by a selected distance greater than said first distance, means for applying microwave energy to one end of alternate pairs of waveguide sections and means for applying microwave energy to the other ends of the remaining waveguide sections.

4. A microwave antenna as set forth in claim 3 having reflectors fastened to the outside broad faces of the outside waveguide sections, said reflectors being provided with cutaway portions adjacent said half-wavelength slots.

5. A microwave antenna comprising, at least four rectangular waveguide sections arranged in pairs and in parallel side by side relation with their narrow faces lying in the same plane, said narrow faces being provided with inclined half-wavelength slots longitudinally spaced by equal half-wavelength distances along said waveguide sections, the slots in alternate pairs of waveguide sections being offset by half the spacing distance from the slots in the remaining waveguide sections, the waveguide sections forming each pair being transversely spaced from each other by a first selected distance with adjacent pairs of waveguide sections transversely spaced by a selected distance greater than said first distance, means for applying microwave energy to one end of alternate pairs of waveguide sections and means for applying microwave energy to the other ends of the remaining waveguide sections.

6. A microwave antenna as set forth in claim 5 having reflectors fastened to the outside broad faces of the outside waveguide sections, said reflectors being provided with cutaway portions adjacent said half-wavelength slots.

References Cited in the file of this patent

UNITED STATES PATENTS

| | | |
|---|---|---|
| 2,648,839 | Ford et al. | Aug. 11, 1953 |
| 2,834,014 | Thorne | May 6, 1958 |